United States Patent
Viswanathan

(10) Patent No.: US 10,870,351 B2
(45) Date of Patent: Dec. 22, 2020

(54) METHOD AND APPARATUS FOR AUGMENTED REALITY BASED ON LOCALIZATION AND ENVIRONMENTAL CONDITIONS

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 134 days.

(21) Appl. No.: 16/217,538

(22) Filed: Dec. 12, 2018

(65) Prior Publication Data

US 2020/0189390 A1    Jun. 18, 2020

(51) Int. Cl.
*B60K 35/00*    (2006.01)
*G01C 21/32*    (2006.01)
(Continued)

(52) U.S. Cl.
CPC ............. *B60K 35/00* (2013.01); *G01C 21/32* (2013.01); *G01S 17/89* (2013.01);
(Continued)

(58) Field of Classification Search
CPC ............. B60K 35/00; B60K 2370/186; B60K 2370/334; G01C 21/32; G01C 21/3697; G01C 21/3679; G01C 21/365; G01C 21/3658; G01C 21/3602; G01S 17/89; G06K 9/00201; G06K 9/00818
See application file for complete search history.

(56) References Cited

U.S. PATENT DOCUMENTS 9,162,622 B2 * 10/2015 Szczerba ............... G08G 1/166
2004/0066376 A1    4/2004 Donath et al.
(Continued)

FOREIGN PATENT DOCUMENTS

GB    2548718 B  *  9/2019    ......... G06K 9/00818
WO    WO 2013/113500 A1    8/2013

OTHER PUBLICATIONS

Abdi et al., Augmented Reality Based Traffic Sign Recognition for Improved Driving Safety, Springer International Publishing Switzerland 2015 (Year: 2015).*
(Continued)

*Primary Examiner* — Thomas Ingram
(74) *Attorney, Agent, or Firm* — Alston & Bird LLP

(57) ABSTRACT

Methods described herein relate to using vision-based mapping to provide augmented reality of objects in the environment of the vehicle in response to objects being obscured. Methods may include: receiving sensor data from a vehicle traveling along a road segment; identifying a location of the vehicle on the road segment; retrieving map data from a map database of an environment of the road segment at the location of the vehicle on the road segment; identifying an object in the sensor data representing an obscured object in an environment of the vehicle; and providing for display of at least one object from the map data in an augmented reality of the environment, where the at least one object appears overlaid on the obscured object to a driver of the vehicle. The object in the sensor data may include a road sign having information relating to driving along the road segment.

20 Claims, 6 Drawing Sheets

(51) Int. Cl.
*G01S 17/89* (2020.01)
*G06K 9/00* (2006.01)

(52) U.S. Cl.
CPC ..... *G06K 9/00201* (2013.01); *G06K 9/00818* (2013.01); *B60K 2370/186* (2019.05); *B60K 2370/334* (2019.05)

(56) References Cited

U.S. PATENT DOCUMENTS

| | | | |
|---|---|---|---|
| 2009/0041304 A1* | 2/2009 | Bradai | G08G 1/09623 382/104 |
| 2009/0058677 A1* | 3/2009 | Tseng | G08C 17/02 340/904 |
| 2010/0103040 A1* | 4/2010 | Broadbent | G01S 19/48 342/357.28 |
| 2010/0253594 A1 | 10/2010 | Szczerba et al. | |
| 2012/0068859 A1* | 3/2012 | Mochizuki | G08G 1/166 340/903 |
| 2013/0033603 A1* | 2/2013 | Suzuki | G08G 1/096775 348/148 |
| 2015/0012200 A1* | 1/2015 | Joshi | G05D 1/0276 701/70 |
| 2017/0075355 A1 | 3/2017 | Micks et al. | |
| 2018/0003511 A1* | 1/2018 | Browning | G06K 9/00791 |
| 2018/0120842 A1* | 5/2018 | Smith | G01S 13/865 |
| 2018/0328752 A1 | 11/2018 | Tomatsu et al. | |
| 2020/0064910 A1* | 2/2020 | Lyren | G06F 3/011 |

OTHER PUBLICATIONS

Extended European Search Report for Application No. EP 19214465.7 dated May 18, 2020, 8 pages.
Sattar, J. et al., *SafeDrive: A Robust Lane Tracking System for Autonomous and Assisted Driving Under Limited Visibility*, [online] [retrieved Feb. 4, 2019]. Retrieved from the Inernet: <URL: https://arxiv.org/pdf/1701.08449.pdf>, (dated Jan. 31, 2017) 14 pages.

* cited by examiner

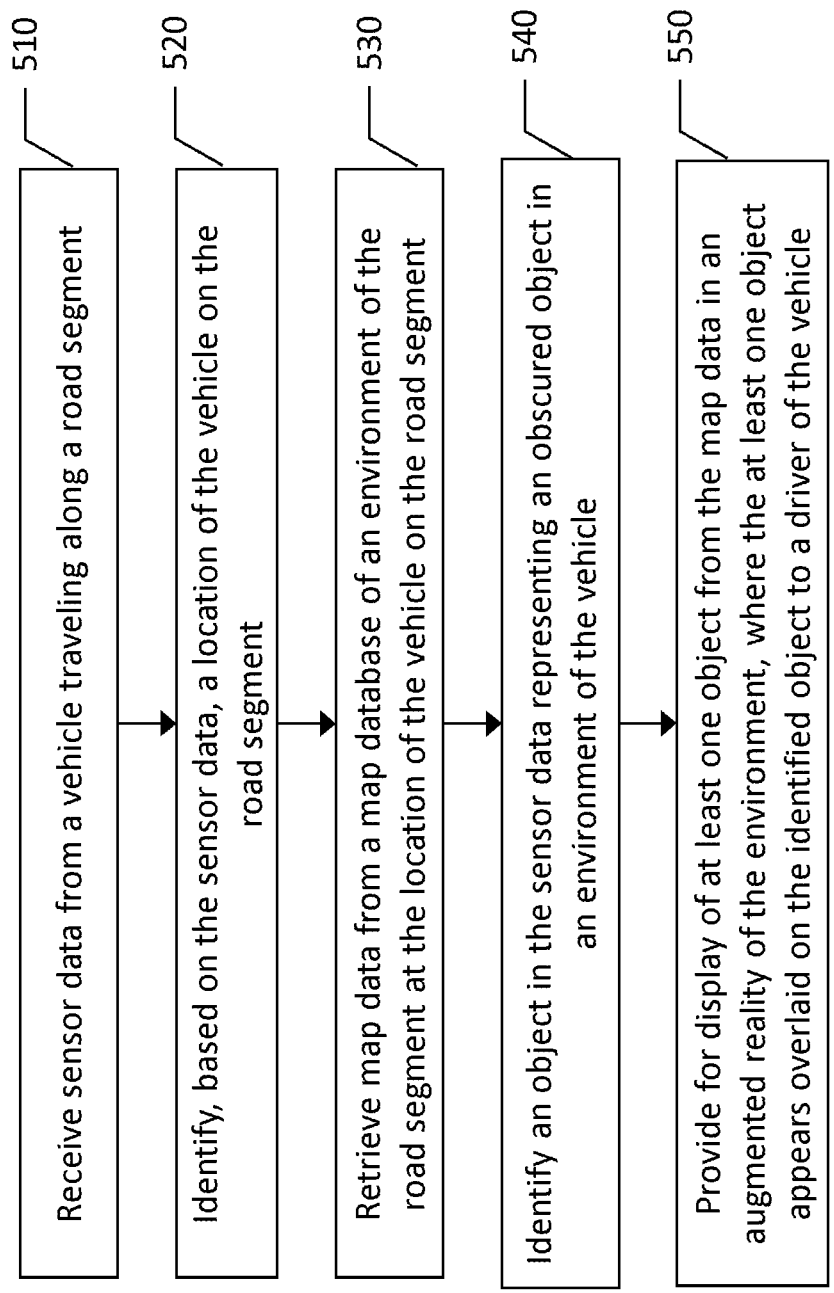

METHOD AND APPARATUS FOR AUGMENTED REALITY BASED ON LOCALIZATION AND ENVIRONMENTAL CONDITIONS

TECHNOLOGICAL FIELD

Example embodiments of the present invention relate generally to providing augmented reality to assist a driver based on environmental conditions, and more particularly, to a process of providing augmented reality overlays of objects of interest within a field of view of a user in response to the visibility of the respective objects of interest being low.

BACKGROUND

Road geometry modelling is very useful for map creation and identification of objects of interest in environments, such as road signs along a road segment. Such object identification may facilitate autonomous vehicle navigation along a prescribed path and/or visual localization of a vehicle traveling along a road segment based on scene or environment identification. Traditional methods for modelling of road geometry and environment or feature detection are resource intensive, often requiring significant amounts of human measurement and calculation. Such methods are thus time consuming and costly. However, building road geometry models may be useful for a variety of applications.

Vision based mapping relies upon the identification of a location based on recognition of the environment. Vision based mapping includes a map represented as a collection of geo-referenced images that are amenable to visual place recognition, which may be part of the road geometry model. In the case of environments that do not have satellite-based navigation availability, or where accuracy from satellite-based navigation methods may be low, a localization technique is needed to position an object, such as a vehicle, within the environment. Vision based mapping and road geometry modelling may be used in cooperation to facilitate vehicle navigation and/or autonomous vehicle control along a road network.

BRIEF SUMMARY

Accordingly, a method, apparatus, and computer program product are provided for using vision-based mapping to provide augmented reality of objects in the environment of the vehicle in response to objects being obscured. Embodiments described herein may provide an apparatus including at least one processor and at least one non-transitory memory including computer program code instructions. The computer program code instructions configured to, when executed, cause the apparatus to at least: receive sensor data from a vehicle traveling along a road segment; identify, based on the sensor data, a location of the vehicle on the road segment; retrieve map data from a map database of an environment of the road segment at the location of the vehicle on the road segment; identify an object in the sensor data representing an at least partially obscured object in an environment of the vehicle; and provide for display of at least one object from the map data in an augmented reality of the environment, where the at least one object appears overlaid on the identified object to an occupant of the vehicle.

According to some embodiments, the object in the sensor data may include a road sign including information relating to driving along the road segment, where causing the apparatus to provide for display of at least one object from the map data in an augmented reality of the environment includes causing the apparatus to provide for display of an image of the road sign stored in map data, where the image of the road sign appears, to a driver of the vehicle, to be overlaid on the road sign in the environment. Causing the apparatus to identify, based on the sensor data, a location of the vehicle on the road segment may include causing the apparatus to process the sensor data through a localization framework and receive, from the localization framework, an indication of the location of the vehicle on the road segment.

The sensor data may include image sensor data. Causing the apparatus to identify, based on the sensor data, a location of the vehicle on the road segment may include causing the apparatus to: compare the sensor data to a plurality of images associated with the road segment; identify an image of the plurality of images associated with the road segment as corresponding to the sensor data; and identify a location associated with the image of the plurality of images as the location of the vehicle on the road segment. The sensor data may include at least one of image sensor data or Light Detection and Ranging sensor data, where the location of the vehicle on the road segment may be identified based on a comparison between the sensor data and image data in the map database.

According to some embodiments, causing the apparatus to identify an object in the sensor data representing an at least partially obscured object in an environment of the vehicle may include causing the apparatus to: identify an object in the sensor data; identify a corresponding object in the map data; determine a proportion of the object in the sensor data that is obscured relative to the corresponding object in the map data; and identify the object in the sensor data as an obscured object in response to the proportion of the object in the sensor data that is obscured satisfying a predetermined value. The predetermined value may be dependent upon a type of object in the sensor data.

Embodiments provided herein may include a computer program product having at least one non-transitory computer-readable storage medium having computer executable program code instructions stored therein. The computer-executable program code instructions may include program code instructions to: receive sensor data from a vehicle traveling along a road segment; identify, based on the sensor data, a location of the vehicle on the road segment; retrieve map data from a map database of an environment of the road segment at the location of the vehicle on the road segment; identify an object in the sensor data representing an at least partially obscured object in an environment of the vehicle; and provide for display of at least one object from the map data in an augmented reality of the environment, where the at least one object appears overlaid on the obscured object to an occupant of the vehicle.

The object in the sensor data may include a road sign having information relating to driving along the road segment. The program code instructions to provide for display of at least one object from the map data in an augmented reality of the environment may include program code instructions to provide for display of an image of the road sign stored in map data, where the image of the road sign appears, to a driver of the vehicle, to be overlaid on the road sign in the environment. The program code instructions to identify, based on the sensor data, a location of the vehicle on the road segment may include program code instructions to process the sensor data through a localization framework and receive, from the localization framework, an indication of the location of the vehicle on the road segment.

According to some embodiments, the sensor data may be image sensor data. The program code instructions to identify, based on the sensor data, a location of the vehicle on the road segment may include program code instructions to: compare the sensor data to a plurality of images associated with the road segment; identify an image of the plurality of images associated with the road segment as corresponding to the sensor data; and identify a location associated with the image of the plurality of images as the location of the vehicle on the road segment. The sensor data may include image sensor data or Light Detection and Ranging sensor data, where the location of the vehicle on the road segment may be identified based on a comparison between the sensor data and image data in the map database.

The program code instructions to identify an object in the sensor data representing an at least partially obscured object in an environment of the vehicle may include program code instructions to: identify an object in the sensor data; identify a corresponding object in the map data; determine a proportion of the object in the sensor data that is obscured relative to the corresponding object in the map data; and identify the object in the sensor data as an obscured object in response to the proportion of the object in the sensor data that is obscured satisfying a predetermined value. The predetermined value may be dependent upon a type of object in the sensor data.

Embodiments described herein may provide a method that includes: receiving sensor data from a vehicle traveling along a road segment; identifying, based on the sensor data, a location of the vehicle on the road segment; retrieving map data from a map database of an environment of the road segment at the location of the vehicle on the road segment; identifying an object in the sensor data representing an at least partially obscured object in an environment of the vehicle; and providing for display of at least one object from the map data in an augmented reality of the environment, where the at least one object appears overlaid on the at least partially obscured object to an occupant of the vehicle. The object in the sensor data may include a road sign having information relating to driving along the road segment. Providing for display of at least one object from the map data in an augmented reality of the environment may include providing for display of an image of the road sign stored in map data, where the image of the road sign appears, to a driver of the vehicle, to be overlaid on the road sign of the environment.

According to some embodiments, identifying, based on the sensor data, a location of the vehicle on the road segment may include processing the sensor data through a localization framework and receiving, from the localization framework, an indication of the location of the vehicle on the road segment. The sensor data may be image sensor data, where identifying, based on the sensor data, a location of the vehicle on the road segment may include: comparing the sensor data to a plurality of images associated with the road segment; identifying an image of the plurality of images associated with the road segment as corresponding to the sensor data; and identifying a location associated with the image of the plurality of images as the location of the vehicle on the road segment.

The sensor data may include at least one of image sensor data or Light Detection and Ranging sensor data, where the location of the vehicle on the road segment may be identified based on a comparison between the sensor data and image data in the map database. Identifying an object in the sensor data representing an at least partially obscured object in an environment of the vehicle may include: identifying an object in the sensor data; identifying a corresponding object in the map data; determining a proportion of the object in the sensor data that is obscured relative to the corresponding object in the map data; and identifying the object in the sensor data as an obscured object in response to the proportion of the object in the sensor data that is obscured satisfying a predetermined value.

Embodiments described herein may provide an apparatus that includes: means for receiving sensor data from a vehicle traveling along a road segment; means for identifying, based on the sensor data, a location of the vehicle on the road segment; means for retrieving map data from a map database of an environment of the road segment at the location of the vehicle on the road segment; means for identifying an object in the sensor data representing an at least partially obscured object in an environment of the vehicle; and means for providing for display of at least one object from the map data in an augmented reality of the environment, where the at least one object appears overlaid on the obscured object to an occupant of the vehicle. The object in the sensor data may include a road sign having information relating to driving along the road segment. The means for providing for display of at least one object from the map data in an augmented reality of the environment may include means for providing for display of an image of the road sign stored in map data, where the image of the road sign appears, to a driver of the vehicle, to be overlaid on the road sign of the environment.

According to some embodiments, the means for identifying, based on the sensor data, a location of the vehicle on the road segment may include means for processing the sensor data through a localization framework and means for receiving, from the localization framework, an indication of the location of the vehicle on the road segment. The sensor data may be image sensor data, where the means for identifying, based on the sensor data, a location of the vehicle on the road segment may include: means for comparing the sensor data to a plurality of images associated with the road segment; means for identifying an image of the plurality of images associated with the road segment as corresponding to the sensor data; and means for identifying a location associated with the image of the plurality of images as the location of the vehicle on the road segment.

The sensor data may include at least one of image sensor data or Light Detection and Ranging sensor data, where the location of the vehicle on the road segment may be identified based on a comparison between the sensor data and image data in the map database. The means for identifying an object in the sensor data representing an obscured object in an environment of the vehicle may include: means for identifying an object in the sensor data; identifying a corresponding object in the map data; means for determining a proportion of the object in the sensor data that is obscured relative to the corresponding object in the map data; and means for identifying the object in the sensor data as an obscured object in response to the proportion of the object in the sensor data that is obscured satisfying a predetermined value.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
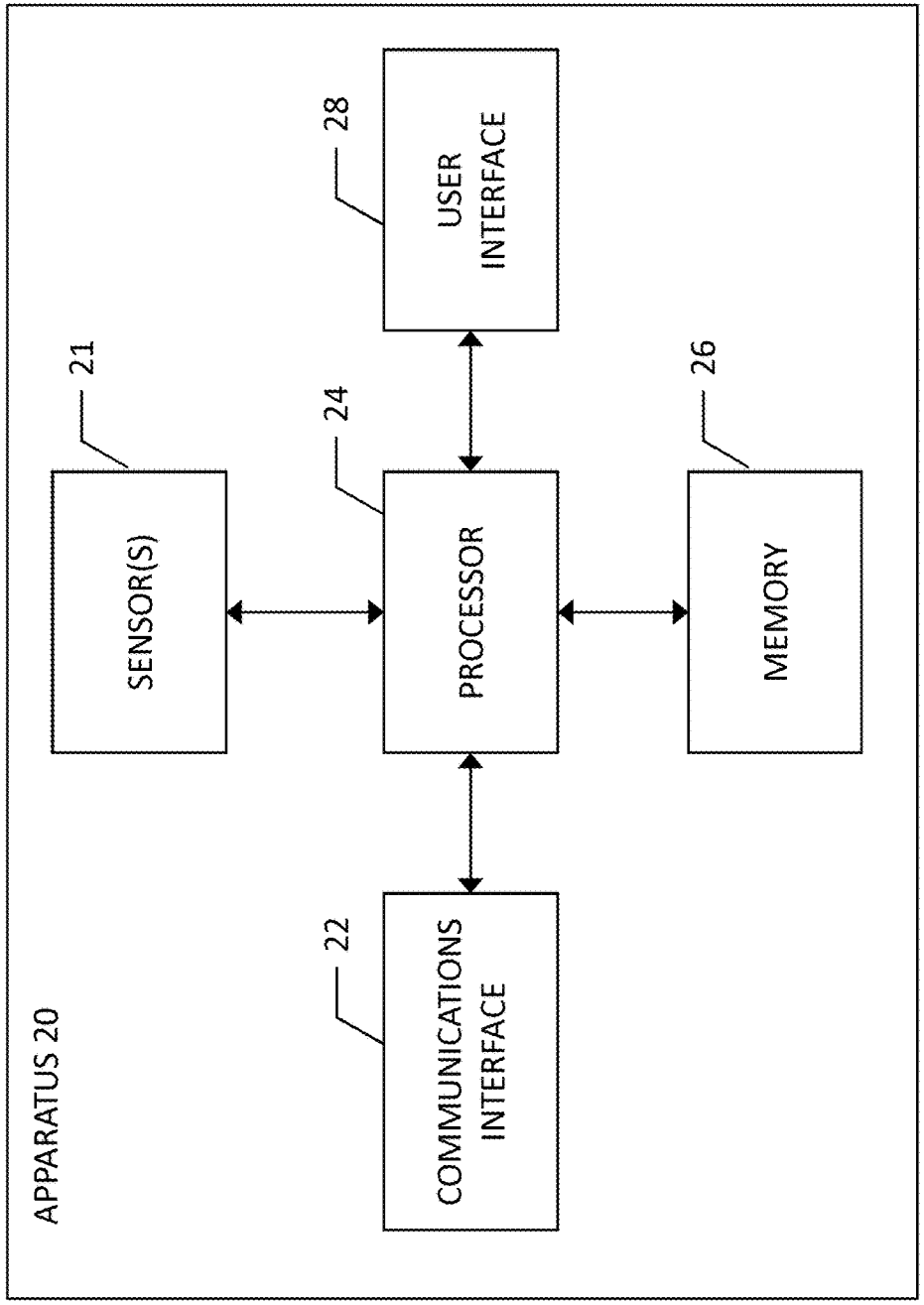
Figure 2:
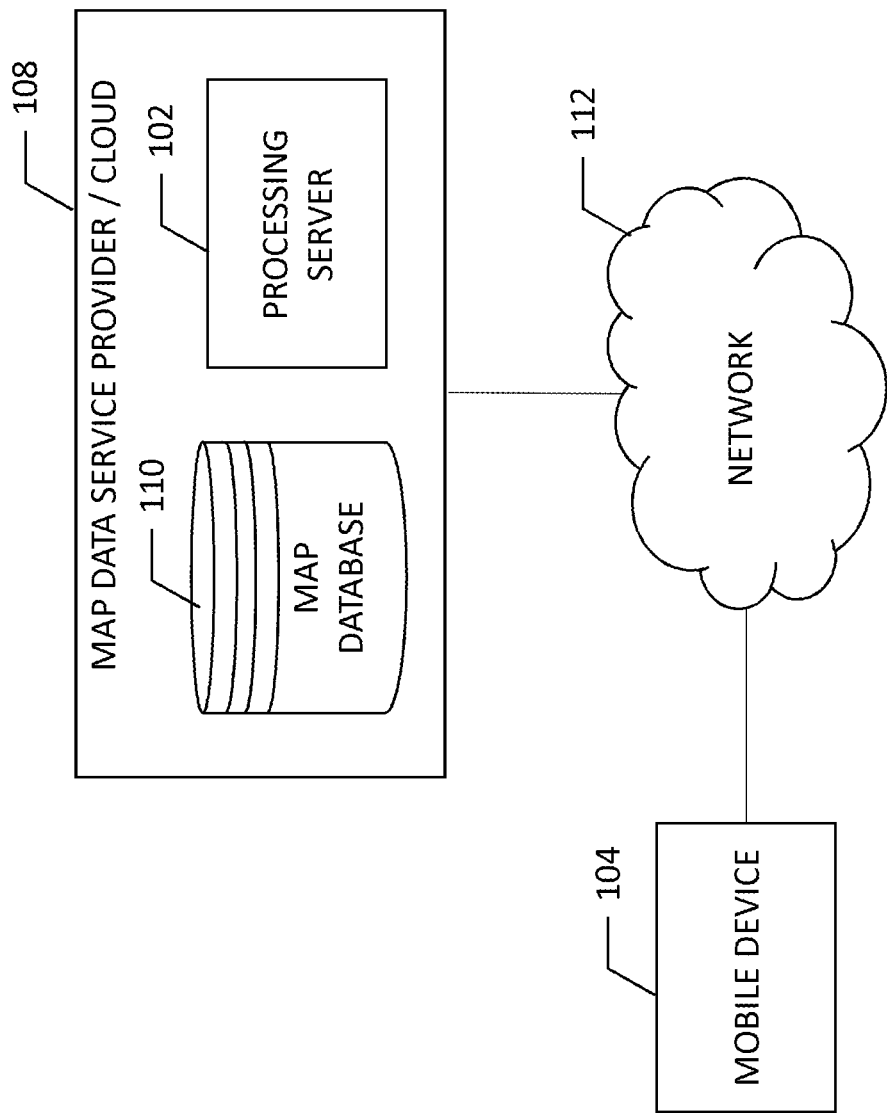
Figure 3:
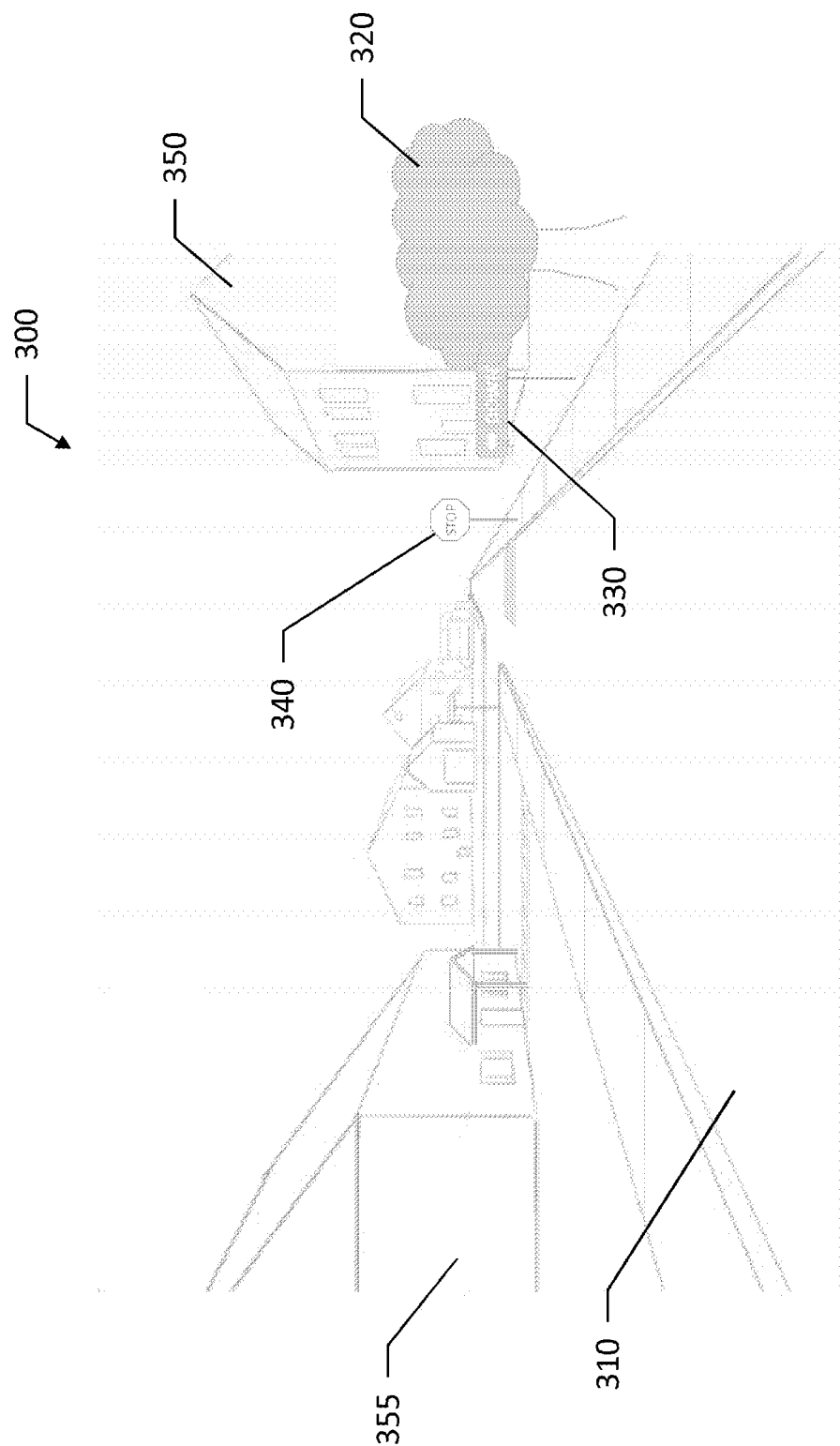
Figure 4:
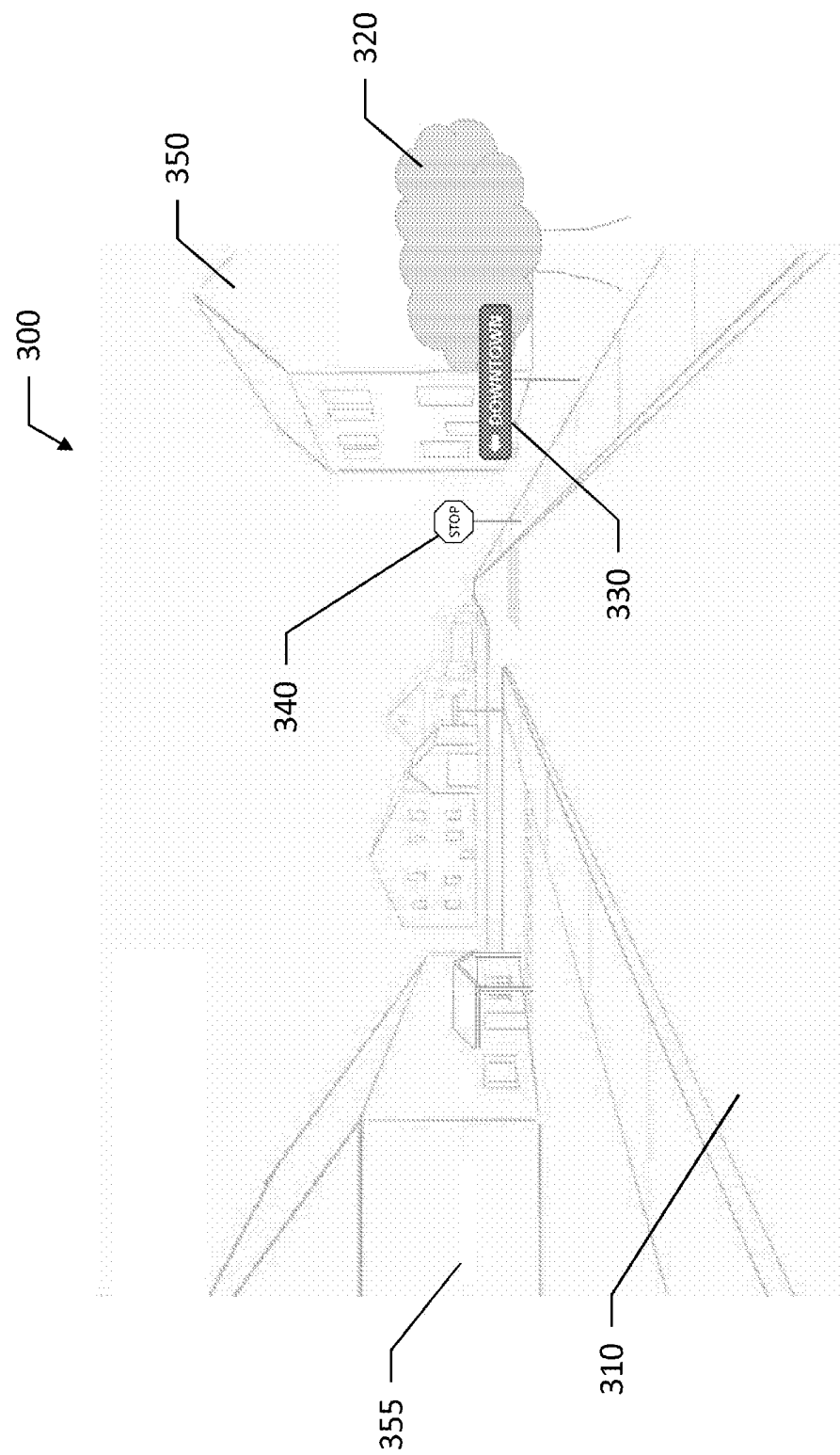
Figure 5:
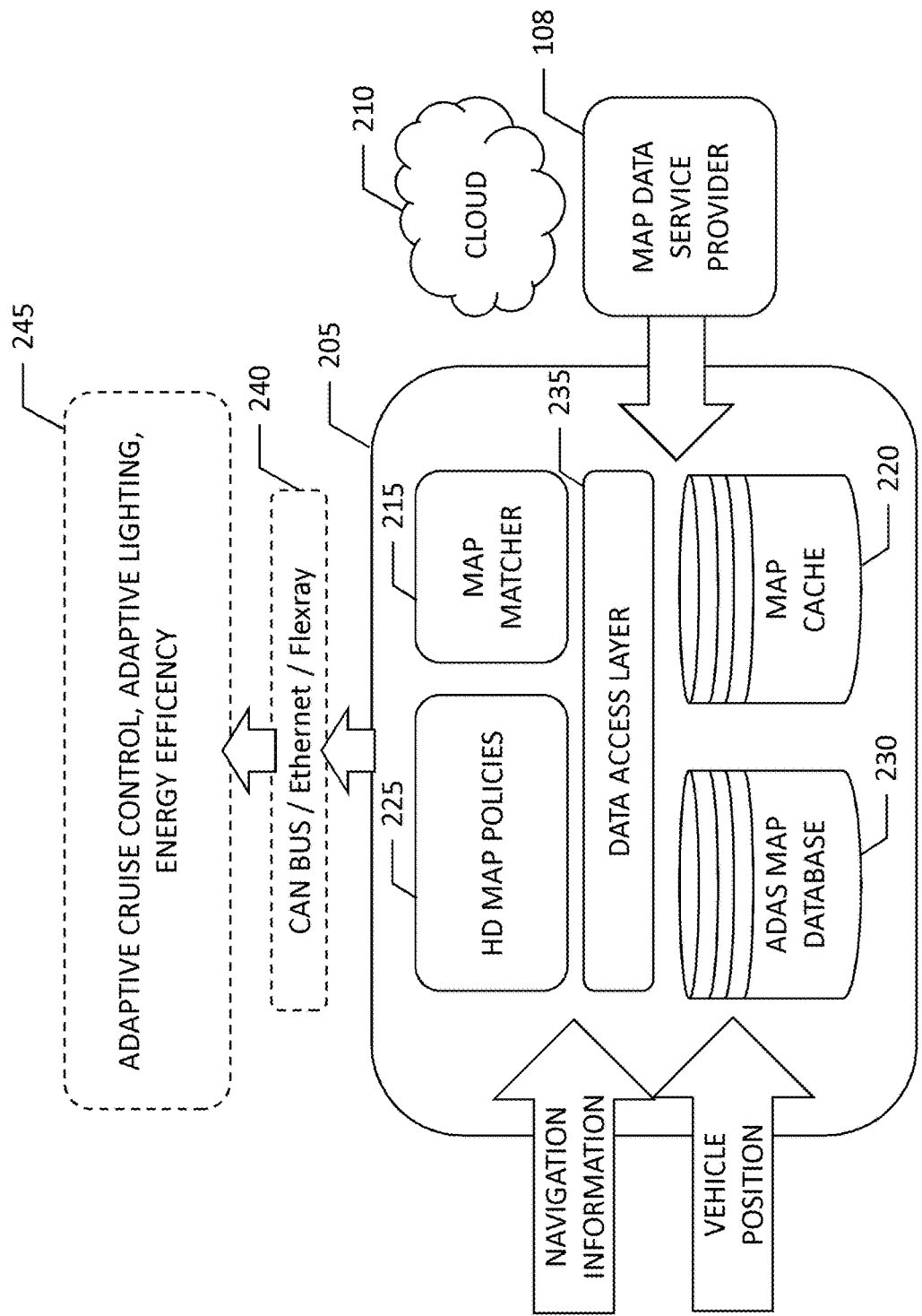

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for providing an augmented reality in response to detection of an obscured object in an environment according to an example embodiment of the present disclosure;

FIG. 3 illustrates an image of a scene including objects that are difficult to see due to inclement weather according to an example embodiment of the present disclosure;

FIG. 4 illustrates the image of the scene of FIG. 3 with images of the critical objects of the scene superimposed over the environment according to an example embodiment of the present disclosure;

FIG. 5 is a block diagram of a system for implementing the methods described herein for providing an augmented reality in response to detection of an obscured object in an environment according to an example embodiment of the present disclosure; and FIG. 6 is a flowchart of operations for providing an augmented reality in response to detection of an obscured object in an environment according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for using vision-based mapping to provide augmented reality of objects in the environment of the vehicle in response to critical objects being obscured. Embodiments described herein relate to vision-based mapping, where a map may be represented as a collection of geo-referenced images that are amenable to visual place-recognition, and include images of objects found along road segments in an environment of a vehicle.

Embodiments described herein relate to using a localized vehicle pose, which may be used to facilitate autonomous vehicle control, to enable augmented reality presentation of objects that are found within the environment of the vehicle. Augmented reality may be used to augment the human driving experience and to increase vehicle safety. In situations in which inclement weather is present, the visibility of objects within an environment of a vehicle, such as road signs, may be limited. The observable features may be those in the near-field region of the vehicle, such as lane lines, signs, etc. A localization framework may be used with a coarse global positioning system (GPS) estimate to refine a position of a vehicle using sensor observations and comparing those observations to an onboard map of the environment. When the observed features and mapped features match, the vehicle may be confirmed as localized relative to the map.

The current context of human driving typically relies upon a combination of Global Positioning System (GPS)-based routing and visual observations of road signs and road features to pilot the vehicle along road segments of a road network. In inclement weather or in areas of poor GPS coverage, GPS may not be accurate or sufficiently reliable to accurately identify a location of the vehicle. Further, GPS accuracy, even at its best, may not be sufficient for certain aspects of autonomous vehicle control. When the location of a vehicle is not accurately identified, in combination with occluded road signs and features, driving in the region may be challenging, particularly when a driver or autonomous vehicle controller may not be able to adequately identify where they are located or what interchanges/intersections are being approached. Road signs and features may be obscured for a variety of reasons. For example, signs or road features may be obscured by heavy rains or snow, while signs may also be obscured due to vegetation. Road signs and features may also suffer from feature decay whereby the features may become difficult to see, such as worn lane lines of a road or faded/sun-bleached road signs. The lack of clear visibility of road signs and features, collectively referred to herein as objects, may render piloting a vehicle difficult, and when combined with poor location identification of a vehicle, navigation may be a difficult challenge.

A localizer, which may be embodied by the apparatus 20 described below, and more particularly, by the processor 22, when deployed on-board a vehicle, may assist with positioning of the vehicle accurately at a lane-level accuracy, whereas GPS may be off by several meters. As such, GPS location alone may cause turns to be missed in dense environments when sufficient turn notice may not be possible. Further, when signs are occluded by snow, foliage, or decay, the navigation decision may fall fully on a human driver that lacks sufficient information to make an informed decision with respect to turns or appropriate lanes. Embodiments described herein provide a technique whereby a human driver, and in some embodiments, an autonomous vehicle controller, may be assisted by a localizer as a navigation aid. Further, augmented reality may provide additional information to a driver or vehicle controller which may aid navigation.

When an environment lacks satellite-based locationing availability, such as the Global Positioning Satellite system, or when satellite-based locationing has low accuracy, a localization technique may be used to position the object relative to a map using only on-board sensor readings. Embodiments described herein may be of particular benefit to vehicle locationing, where identifying the location of a vehicle may be important. Vehicle navigation or autonomous or semi-autonomous vehicle control may rely on accurate identification of a location of a vehicle. As such, it may be important to determine the location of such a vehicle even when satellite based navigation means are not available or reliable. Vision-based mapping matches sensor data from the vehicle to an existing map in the form of geo-referenced images, which allows the vehicle to estimate its position relative to the map with a high degree of accuracy.

Other localization techniques may be used, such as by the apparatus 20 and, more particularly, the processor 22 described below according to example embodiments in which the location of a vehicle may be accurately identified. Such localization techniques may include a localization framework for processing sensor data from a vehicle, or wireless signal fingerprinting, among others. As such, localization of a vehicle on a road network may be achieved in the absence of a GPS signal, or when a GPS signal is weak or unreliable. Embodiments may also work in concert with strong GPS signals to provide a vehicle location more accurately than available through conventional GPS systems.

FIG. 1 is a schematic diagram of an example apparatus configured for performing some of the operations described herein, such as the gathering and processing of images that are geo-referenced for inclusion in a vision-based map database, or capturing of images to compare against a map database of geo-referenced images to identify the location of a vehicle. Apparatus 20 is an example embodiment that may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle with the assistance of establishing the vehicle location using vision-based mapping system according to example embodiments described herein; however embodiments of the apparatus may be embodied or partially embodied as a mobile terminal, such as a personal digital assistant (PDA), mobile telephone, smart phone, personal navigation device, tablet computer, camera or any combination of the aforementioned systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, image sensor, LiDAR (Light Detection and Ranging) sensor, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). According to example embodiments described herein, the user interface 28 may include a heads-up display, whereby information may be presented to a user, such as on the windshield of a vehicle or within an area proximate the windshield of a vehicle. The heads-up display may optionally be user-worn, such as smart-glasses whereby information is presented on the glasses in a manner that the user may continue to look through a transparent portion of the glasses while seeing information displayed on a translucent or semi-opaque portion of the lens. The heads-up display of some embodiments may provide for augmented reality where information or objects may be presented on the display, such as the windshield, in a manner in which the information or objects appear to be part of the environment of the vehicle beyond the windshield, augmenting the reality of the environment.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate via any of various wireless protocols, such as by communicating over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication and/or may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, which may be a map of a vision-based mapping system, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment of an apparatus for use in a vision-based mapping system, the map stored in memory 26 may include a database of geo-referenced images used to identify the location of a vehicle through vision-based mapping techniques. In an example in which the apparatus is embodied by a vehicle, the memory 26 may store a portion of a vision-based map database including only portions of the database that are within a predetermined geographic region relative to the vehicle such that latency may be minimized when establishing a location through analysis of the geo-referenced images.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Having an accurate understanding of a location is of import to navigation assistance and autonomous or semi-autonomous vehicle control.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. Autonomous and semi-autonomous vehicle control may be performed in a variety of different ways. However, an understanding of the location of the vehicle is critical when using any form of map-based vehicle control. While some degree of autonomy can be provided through visual identification of objects along a road by a vehicle traveling along the road, such vision-based autonomous control strategies may benefit from or rely upon proper location identification of the vehicle among the road network. For example, accurately identifying the location of a vehicle along a road segment may enable identification of roadway restrictions, such as a speed limit, but also provide an understanding of the road geometry which may be stored in the map database, such as in a High Definition (HD) map database. In such embodiments, sensors on the vehicle may be used to establish dynamic obstacles and other vehicles on the road segment, while an understanding of the environment may rely upon accurate identification of the vehicle on a road segment.

Autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may include, for example, the apparatus 20 of FIG. 2, in the form of, for example, a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data, georeferenced image data for vision-based locating, or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example. Such an embodiment may benefit vehicles using or relying on vision-based locating by storing or caching a portion of the database of geo-tagged images used for vision-based mapping on memory local to the vehicle in order to reduce or eliminate latency, which may be important during autonomous vehicle control that relies upon accurate location identification during operation.

As described above, the map database 110 of example embodiments may be generated from a plurality of different sources of data. Additional data may be stored in the map database such as traffic information, routing information, etc. This data may supplement the HD map data that provides an accurate depiction of a network of roads in the geographic region in a high level of detail including road geometries, features along the roads such as signs, rules related to travel along road segments such as speed limits, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to several centimeters and may identify objects proximate a road segment, features of a road segment including lane widths, lane markings, traffic direction, road signs, speed limits, lane restrictions, etc. Autonomous and semi-autonomous vehicles may use these HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, Light Detection and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Embodiments described herein may broadly relate to using an on-board localizer (e.g., a vision-based localizer or localization framework as implemented, for example, by the apparatus 20 and, more particularly, by the processor 24) to assist a human driver and/or vehicle controller to navigate road conditions involving inclement weather or road features that have decayed or degraded. More particularly, embodiments described herein may identify a localized pose that is used to project one or more features of a map, such as a road sign, on a user interface, such as user interface 28 of apparatus 20. Objects of a road segment, as stored in a map such as the HD map, may be aligned with obstructed or degraded features of a road segment to provide a driver with a view of the road segment with unobscured objects to aid in navigation and piloting the vehicle along the road segment.

A visual map generated through embodiments described herein may provide a comprehensive database of the environment along each road segment of a network of roadways. The visual map may be part of or work in concert with HD maps as described above to facilitate navigational assistance, autonomous or semi-autonomous driving, and accurate location identification. The map may be stored for example, in map database 110, and/or the map or a portion thereof may be stored locally, such as in memory 26, such that latency may be reduced when a vehicle is referencing a map database stored locally within the vehicle. Location identification, using a vision based localization as used in some embodiments described herein, may be implemented by correlating sensor readings of a sensor 21, such as an image sensor or LiDAR sensor, for example, of a vehicle traveling along a road segment with the visual map generated as described herein. This method of location determination may facilitate navigation and various degrees of autonomous vehicle control.

The localization framework may compare observations from various sensors of a vehicle to a map which, as noted, may be stored locally or remotely at a map services provider. The localization framework may establish the position of the vehicle with a high degree of accuracy and certainty. Sensor data may include features such as lane lines, signs, or other static objects positioned along a road segment that may be used to identify a location of the vehicle based on the sensor data. When alignment between the vehicle sensor data and a location along the road segment is achieved, features from the stored map database, such as road signs, may be projected onto the sensor observations to overlay the mapped regions on the observed regions within the environment.

The user interface of example embodiments described herein may provide a display through which the overlaid features of the mapped regions may be presented. A display may be a heads up display in which the overlaid features may be presented in a manner in which they augment reality for a driver and/or passenger of the vehicle. For example, a windshield of a vehicle may be used as a display screen by which a heads-up display projects images to the windshield, which in turn are reflected toward a driver/passenger of the vehicle. Such a heads-up display provides the appearance that an image projected onto the windshield is within the environment outside the vehicle in an augmented reality manner. Other displays may be used, such as augmented reality glasses which may provide a perspective to the wearer similar to that of a heads-up display, where an image is projected onto a lens of the glasses to appear superimposed over an environment of the wearer visible through the glasses.

While some example embodiments may use a heads-up display, a vehicle may not be equipped to provide a heads-up display such that an alternative display may be provided. For example, a display within a vehicle, such as a navigation display, may be used to provide the augmented reality image produced according to example embodiments described herein. One or more image sensors of a vehicle may capture images/video of the environment around a vehicle, such as the road segment in front of the vehicle. This image/video feed may be presented on a display, which may also serve as the navigation display. When an object in the environment of the vehicle is obscured due to weather, decay, or the like, a stored image of the object may be presented on the display, superimposed over the object that is obscured. This may provide an augmented reality that provides a clear understanding to a driver or passenger regarding the road segment ahead of a vehicle and the objects that may not be clearly visible to a driver of the vehicle. Further, the navigation display may revert from the augmented reality view to a navigational view once it is established that no obscured objects are in the field of view of a user, and augmented reality using images from the stored digital maps is not necessary.

Embodiments described herein may provide an augmented reality view of an environment of a vehicle responsive to a determination that objects in the environment of the vehicle pertinent to navigation and/or to safe operation of the vehicle are at least partially obscured. FIG. 3 illustrates an example embodiment of an environment 300 of a vehicle traveling along a road segment 310. As shown, features of the environment are faint due to the fog obscuring elements of the environment. A tree 320 is depicted obstructing a view of a sign 330, while stop sign 340 is barely visible through the fog. Embodiments of the present disclosure may use sensors, such as LiDAR and image sensors to determine a position of the vehicle within the environment. The sensors may detect buildings, such as buildings 350 and 355, proximate a road segment 310. Using the information captured by the sensors of the vehicle, the localization framework implemented, for example, by the apparatus 20 and, more particularly, by the processor 24 may identify an accurate location of the vehicle, and align the images of the sensor with stored images in the vision-based mapping database.

The sensors, such as sensors 21, of the vehicle in comparing images of the sensed environment with image data of the map database, may establish that critical features of the environment are not sufficiently visible to a driver of the vehicle. In response to this determination, images of critical objects stored in the map database may be presented to a driver of the vehicle using augmented reality. FIG. 4 illustrates an augmented reality view of the environment of FIG. 3, in which critical features of the stop sign 340 and the road sign 330 are presented in an overlay, superimposed on the environment 300. This enables a driver of the vehicle to clearly see the road sign 330 and the stop sign 340 in the foggy environment 300.

Critical features of an environment may include features that relate to navigation (e.g., road signs, lane markings, etc.) or features that are instructive of road restrictions (e.g., stop signs, speed limit signs, etc.). These critical features may be identified in an environment through sensor data captured by vehicles traversing the environment, where the sensor data is processed, such as through a perception system. A perception system may identify the critical features and their location within an environment such that critical features may be separated from a sensed environment and stored as image objects within the map database. These image objects may be tagged according to their content and location along a road segment, such that they are identified as critical features of the environment that may need to be superimposed on the environment in an instance in which a corresponding object in the environment is not visible due to weather, decay, or other obstructions.

Embodiments described herein may determine when an object is obscured or not visible in an environment based on a comparison between the objects in the sensor data from the vehicle against the map data including the objects. Each object in the sensor data that is a critical object may be compared against a corresponding critical object in the map data to establish a degree of obstruction. For example, a critical object that is established to be only five-percent obstructed may not be considered an obstructed object, such that an augmented reality overlay is not necessary. However, a critical object established as fifty-percent obstructed may be considered obstructed and is overlaid in an augmented reality. The degree of obstruction or the proportion of an object that is obstructed before an overlay is determined to be necessary may vary and may be user defined. Further, the degree of obstruction may vary based on the type of object. For example, an object such as a stop sign may be easily recognizable by a portion of the stop sign, while a speed limit sign may require more of the sign to be visible to communicate the speed limit on the road segment. As such, a proportion of the sign that is obstructed may be compared against the type of object to determine whether an overlay is necessary.

An anchor point may be identified for each object image that is stored in the map database, where the anchor point may be a consistent feature point whereby superposition of the image object over an object in an environment relies upon aligning the anchor point of the image object with an identified anchor point of the object in the environment. Optionally, corners or sides of an object may be identified as anchors of an object. Using corners or sides of an object may allow for re-sizing of an image object in order to appropriately scale an image object when superimposing the image object over the corresponding object in an environment.

As described above, HD maps and the visual maps generated as described herein may be instrumental in facilitating manual or autonomous vehicle control. Building the HD maps and visual maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps and visual maps, and to facilitate autonomous control of the vehicle generating the sensed data.

According to example embodiments described herein, the role of HD maps and visual maps in facilitating manual, autonomous, or semi-autonomous vehicle control may include crowd-sourced building of the maps to identify and confirm objects along with their respective locations. In the context of map-making, the features from the environment may be detected by a perception system of a map services provider or a vehicle traveling along a road segment and consolidated to form a representation of the actual real-world environment in the form of a map.

FIG. 5 illustrates an example embodiment of architecture specifically configured for implementing embodiments described herein. The illustrated embodiment of FIG. 5 may be vehicle-based, where sensor data is obtained from sensors of a vehicle traveling along a road segment. The location of the collected sensor data along the road segment may be determined through location determination using GPS or other locationing means, or using visual map correlation through correlation with map data of map data service provider 108. As illustrated, the architecture includes a map data service provider 108 that provides map data (e.g., visual maps and HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). Further, signs along the road segment may be used to understand rules of operation along the road segment, and to identify changes to traffic flows which may be communicated via signs. The information from signs and their location along road segments may inform policies that govern how a vehicle is to traverse a road segment and these policies may be stored, for example, in an HD map of the region. The HD map policies associated with the road segment may be provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors used to capture data relating to the surrounding environment. A vehicle with autonomous or semi-autonomous control may detect features in the environment of the vehicle using a perception system trained according to embodiments described herein to facilitate the autonomous or semi-autonomous control. Sensor redundancy may be used to provide additional confirmation relating to features and objects of the environment and to improve detection and reliability of vehicle interpretation of the surrounding environment. In order to implement full autonomy for a vehicle, the vehicle must be contextually aware in that the vehicle must be aware of the surroundings in terms of both dynamic conditions (e.g., weather, traffic, construction) and static conditions (e.g., road geometry, road signs). The vehicle context may be interpreted based on sensor observations that are passed through a perception module, which may be embodied by the apparatus 20, or more particularly, by processor 22, to understand the content of the observed environment. The perception module's set of detectors may correspond to deep-neural network based methods of understanding features in the environment and identifying a location of the features in the environment. Embodiments described herein include a method to improve the performance of detecting features and objects in an environment and properly locating them in the environment beyond conventional methods relying on human, manual labeling of objects in all image datasets as many of these images may not provide the informative value to the neural network provided by those that satisfy the neural network thresholds described above.

FIG. 6 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 is a flowchart of a method for providing augmented reality overlays of objects of interest within a field of view of a user in response to the visibility of the respective objects of interest being low. As shown, at 510, sensor data is received from a vehicle traveling along a road segment. At 520, a location of the vehicle is identified along the road segment based on the sensor data. Map data is retrieved from a map database at 530 of an environment of the road segment at the location of the vehicle on the road segment. At 540 an object is identified in the sensor data representing an obscured object in an environment of the vehicle. At 550, at least one object is provided for display from the map data in an augmented reality of the environment, where the at least one object appears overlaid on the identified object to a driver of the vehicle.

In an example embodiment, an apparatus for performing the method of FIG. 6 above may comprise a processor (e.g., the processor 24) configured to perform some or each of the operations (510-550) described above. The processor may, for example, be configured to perform the operations (510-550) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-550 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
receive sensor data from a vehicle traveling along a road segment;
identify, based on the sensor data, a location of the vehicle on the road segment;
retrieve map data from a map database of an environment of the road segment at the location of the vehicle on the road segment, wherein the map data comprises a plurality of geo-referenced images associated with the road segment that are amenable to visual place-recognition;
identify an object in the sensor data representing an at least partially obscured object in an environment of the vehicle;
compare the sensor data to the plurality of geo-referenced images associated with the road segment;
identify an image of the plurality of geo-referenced images associated with the road segment as corresponding to the sensor data based on the comparison; and
provide for display of at least one object from the map data in an augmented reality of the environment, wherein the at least one object appears overlaid on the at least partially obscured object to an occupant of the vehicle.

2. The apparatus of claim 1, wherein the object in the sensor data comprises a road sign including information relating to driving along the road segment, wherein causing the apparatus to provide for display of at least one object from the map data in an augmented reality of the environment comprises causing the apparatus to provide for display of an image of the road sign stored in map data, wherein the image of the road sign appears, to a driver of the vehicle, to be overlaid on the road sign in the environment.

3. The apparatus of claim 1, wherein causing the apparatus to identify, based on the sensor data, a location of the vehicle on the road segment comprises causing the apparatus to process the sensor data through a localization framework and receive, from the localization framework, an indication of the location of the vehicle on the road segment.

4. The apparatus of claim 1, wherein the sensor data comprises image sensor data, and wherein causing the apparatus to identify, based on the sensor data, a location of the vehicle on the road segment further comprises causing the apparatus to:
confirm a location associated with the image of the plurality of geo-referenced images as the location of the vehicle on the road segment.

5. The apparatus of claim 1, wherein causing the apparatus to identify an object in the sensor data representing an at least partially obscured object in an environment of the vehicle comprises causing the apparatus to:
identify an object in the sensor data;
identify a corresponding object in the map data;
determine a proportion of the object in the sensor data that is obscured relative to the corresponding object in the map data; and
identify the object in the sensor data as an obscured object in response to the proportion of the object in the sensor data that is obscured satisfying a predetermined value.

6. The apparatus of claim 5, wherein the predetermined value is dependent upon a type of object in the sensor data.

7. The apparatus of claim 1, wherein the computer program code instructions are configured to, when executed, further cause the apparatus to at least:
receive a first plurality of sensor data from at least a first plurality of vehicles travelling on one or more road segments;
compile the first plurality of sensor data into a platform specification format;
generate a first plurality of map data from at least the first plurality of sensor data compiled in the platform specification format;
generate the map database based on at least the platform specification format;
store the first plurality of map data in the map database;
receive a second plurality of sensor data from at least a second plurality of vehicles travelling on the one or more road segments; and
update the map database based on the second plurality of sensor data.

8. A computer program product comprising at least one non-transitory computer-readable storage medium having computer-executable program code instructions stored therein, the computer-executable program code instructions comprising program code instructions to:
receive sensor data from a vehicle traveling along a road segment;
identify, based on the sensor data, a location of the vehicle on the road segment;
retrieve map data from a map database of an environment of the road segment at the location of the vehicle on the road segment, wherein the map data comprises a plurality of geo-referenced images associated with the road segment that are amenable to visual place-recognition;
identify an object in the sensor data representing an at least partially obscured object in an environment of the vehicle;

compare the sensor data to the plurality of geo-referenced images associated with the road segment;

identify an image of the plurality of geo-referenced images associated with the road segment as corresponding to the sensor data based on the comparison; and provide for display of at least one object from the map data in an augmented reality of the environment, wherein the at least one object appears overlaid on the at least partially obscured object to an occupant of the vehicle.

9. The computer program product of claim 8, wherein the object in the sensor data comprises a road sign including information relating to driving along the road segment, wherein the program code instructions to provide for display of at least one object from the map data in an augmented reality of the environment comprises program code instructions to provide for display of an image of the road sign stored in map data, wherein the image of the road sign appears, to a driver of the vehicle, to be overlaid on the road sign in the environment.

10. The computer program product of claim 8, wherein the program code instructions to identify, based on the sensor data, a location of the vehicle on the road segment comprises program code instructions to process the sensor data through a localization framework and receive, from the localization framework, an indication of the location of the vehicle on the road segment.

11. The computer program product of claim 8, wherein the sensor data comprises image sensor data, and wherein the program code instructions to identify, based on the sensor data, a location of the vehicle on the road segment further comprises program code instructions to:
confirm a location associated with the image of the plurality of geo-referenced images as the location of the vehicle on the road segment.

12. The computer program product of claim 8, wherein the program code instructions to identify an object in the sensor data representing an at least partially obscured object in an environment of the vehicle comprises program code instructions to:
identify an object in the sensor data;
identify a corresponding object in the map data;
determine a proportion of the object in the sensor data that is obscured relative to the corresponding object in the map data; and
identify the object in the sensor data as an obscured object in response to the proportion of the object in the sensor data that is obscured satisfying a predetermined value.

13. The computer program product of claim 12, wherein the predetermined value is dependent upon a type of object in the sensor data.

14. The computer program product of claim 8, wherein the computer-executable program code instructions further comprise program code instructions to:
receive a first plurality of sensor data from at least a first plurality of vehicles travelling on one or more road segments;
compile the first plurality of sensor data into a platform specification format;
generate a first plurality of map data from at least the first plurality of sensor data compiled in the platform specification format;
generate the map database based on at least the platform specification format;
store the first plurality of map data in the map database;
receive a second plurality of sensor data from at least a second plurality of vehicles travelling on the one or more road segments; and
update the map database based on the second plurality of sensor data.

15. A method comprising:
receiving sensor data from a vehicle traveling along a road segment;
identifying, based on the sensor data, a location of the vehicle on the road segment;
retrieving map data from a map database of an environment of the road segment at the location of the vehicle on the road segment, wherein the map data comprises a plurality of geo-referenced images associated with the road segment that are amenable to visual place-recognition;
identifying an object in the sensor data representing an at least partially obscured object in an environment of the vehicle;
comparing the sensor data to the plurality of geo-referenced images associated with the road segment;
identifying an image of the plurality of geo-referenced images associated with the road segment as corresponding to the sensor data based on the comparison; and
providing for display of at least one object from the map data in an augmented reality of the environment, wherein the at least one object appears overlaid on the at least partially obscured object to an occupant of the vehicle.

16. The method of claim 15, wherein the object in the sensor data comprises a road sign including information relating to driving along the road segment, providing for display of at least one object from the map data in an augmented reality of the environment comprises providing for display of an image of the road sign stored in map data, wherein the image of the road sign appears, to a driver of the vehicle, to be overlaid on the road sign in the environment.

17. The method of claim 15, wherein identifying, based on the sensor data, a location of the vehicle on the road segment comprises processing the sensor data through a localization framework and receiving, from the localization framework, an indication of the location of the vehicle on the road segment.

18. The method of claim 15, wherein the sensor data comprises image sensor data, and wherein identifying, based on the sensor data, a location of the vehicle on the road segment further comprises:
confirming a location associated with the image of the plurality of geo-referenced images as the location of the vehicle on the road segment.

19. The method of claim 15, wherein identifying an object in the sensor data representing an at least partially obscured object in an environment of the vehicle comprises:
identifying an object in the sensor data;
identifying a corresponding object in the map data;
determining a proportion of the object in the sensor data that is obscured relative to the corresponding object in the map data; and
identifying the object in the sensor data as an obscured object in response to the proportion of the object in the sensor data that is obscured satisfying a predetermined value.

20. The method of claim 15, further comprising:
receiving a first plurality of sensor data from at least a first plurality of vehicles travelling on one or more road segments;

compiling the first plurality of sensor data into a platform specification format;
generating a first plurality of map data from at least the first plurality of sensor data compiled in the platform specification format;
generating the map database based on at least the platform specification format;
storing the first plurality of map data in the map database;
receiving a second plurality of sensor data from at least a second plurality of vehicles travelling on the one or more road segments; and
updating the map database based on the second plurality of sensor data.

\* \* \* \* \*